US006688681B2

(12) United States Patent
Birt

(10) Patent No.: US 6,688,681 B2
(45) Date of Patent: Feb. 10, 2004

(54) SUN BLIND ASSEMBLY

(75) Inventor: David Birt, Cannock (GB)

(73) Assignee: ArvinMeritor GmbH, Frankfurt (DE)

( * ) Notice: Subject to any disclaimer, the term of this patent is extended or adjusted under 35 U.S.C. 154(b) by 0 days.

(21) Appl. No.: 10/309,928

(22) Filed: Dec. 4, 2002

(65) Prior Publication Data

US 2003/0122393 A1 Jul. 3, 2003

(30) Foreign Application Priority Data

Dec. 29, 2001 (GB) .............................................. 0131088

(51) Int. Cl.[7] .................................................. B60J 7/00
(52) U.S. Cl. ........................ 296/211; 296/214; 359/598; 359/592
(58) Field of Search ................................ 296/211, 214, 296/215; 359/592–595, 596, 598, 601, 609, 844

(56) References Cited

U.S. PATENT DOCUMENTS

| 755,196 | A | * | 3/1904 | Wadsworth | .................. 359/601 |
| 4,089,594 | A | | 5/1978 | Ewin | |
| 4,498,455 | A | | 2/1985 | Gramm | |
| 4,621,898 | A | * | 11/1986 | Cohen | |
| 4,756,603 | A | * | 7/1988 | Ohtani | |
| 5,405,184 | A | * | 4/1995 | Jardin et al. | ................. 296/215 |
| 6,282,911 | B1 | * | 9/2001 | Watanabe et al. | ........... 296/214 |
| 6,437,898 | B1 | * | 8/2002 | Stancel et al. | .............. 296/215 |
| 6,491,338 | B2 | * | 12/2002 | De Torbal | ................... 296/211 |

FOREIGN PATENT DOCUMENTS

| GB | 1589163 | 7/1977 |
| GB | 2025501 | 1/1980 |
| GB | 2145760 | 4/1985 |
| JP | 7304332 | 11/1995 |

OTHER PUBLICATIONS

Search report, dated Apr. 30, 2002.

* cited by examiner

Primary Examiner—Dennis H. Pedder
(74) Attorney, Agent, or Firm—Carlson, Gaskey & Olds

(57) ABSTRACT

A sun blind assembly including an incident surface and a lens element, the incident surface having a reflective region which reflects incident light and a non-reflective region which transmits incident light, the lens element and incident surface being arranged such that the transmitted light incident on the lens element is substantially refracted so as to appear of substantially uniform intensity

21 Claims, 3 Drawing Sheets

SUN BLIND ASSEMBLY

REFERENCE TO RELATED APPLICATIONS

The present application claims priority to United Kingdom patent application number 0131088.7, filed Dec. 29, 2001.

BACKGROUND OF THE INVENTION

The present invention relates to sun blind assemblies, in particular to sun blind assemblies for use in vehicles with glass sunroofs.

Glass sunroofs, by their very nature, allow light, and therefore heat, that is incident on the glass, to be transmitted through the glass and into the vehicle. This results in a temperature increase inside the vehicle, which can be uncomfortable to the vehicle occupants.

To overcome this problem, it is known to include a sun blind located below the sunroof, the sun blind may include apertures which allow a certain percentage of light to be transmitted, and therefore reducing the total amount of transmitted light and hence heat, potentially reducing air-conditioning requirements with potential fuel economy gains.

However, the apertures give the sun blind a striated appearance, i.e. the light from inside the vehicle does not appear of uniform intensity, which some vehicle purchasers find aesthetically undesirable.

An object of the present invention is to provide a sun blind assembly which filters out a percentage of the light and thus heat, but is aesthetically pleasing.

Thus, according to the present invention there is provided a sun blind assembly including an incident surface and a lens element, the incident surface having a reflective region which reflects incident light and a non-reflective region which transmits incident light, the lens element and incident surface being arranged such that the transmitted light incident on the lens element is substantially refracted so as to appear of substantially uniform intensity.

Advantageously this gives the sun blind assembly an appearance of uniform light from inside the vehicle, but with reduced transmission of heat.

BRIEF DESCRIPTION OF THE DRAWINGS

The invention will now be described, by way of example only, with reference to the accompanying drawings in which.

DETAILED DESCRIPTION OF THE PREFERRED EMBODIMENT

Figure 1:
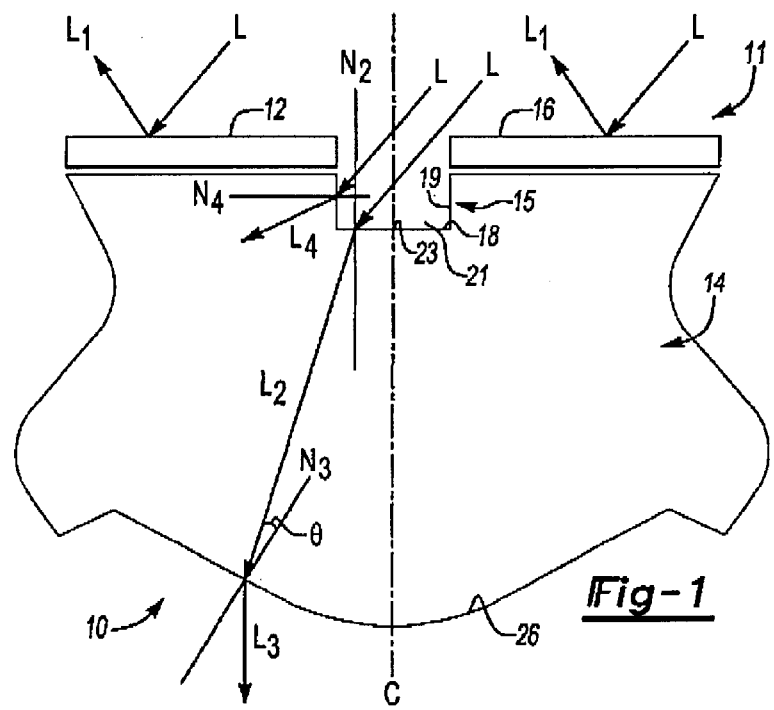
FIG. 1 is a cross-sectional view of part of a sun blind assembly according to the present invention.

With reference to FIG. 1, there is shown part of a sun blind assembly 10.

The sun blind assembly is located below a glass sunroof (not shown) of a vehicle (not shown). Typically the assembly will be supported by and move on rails which are fixed to the vehicle roof (not shown).

In other embodiments the sun blind assembly may be supported by the sunroof itself.

The sun blind assembly 10 includes an incident surface 11, which is castellated, and a plurality of identical elongate lens elements 14 (only one of which is shown). The longitudinal axis of the elongate lens is into and out of the plane of the drawing.

The incident surface 11 includes a plurality of identical reflective regions, in the form of a metallic coating 12, and a plurality of identical non-reflective regions 18 (only one of which is shown). Note that it is also possible to include at least two adjacent non-reflective regions having different dimensions to transmit different percentages of incident light.

The incident surface includes an elongate indent 15, the indent having two sides 19 and a base 21. In this embodiment, the width of the base 21 represents approximately 20% of the width of the lens element. Thus the sum total of the indent base widths of the assembly is approximately 20% of the combined width of all the lens elements.

The lens element is convex, and has a focal point (not shown) on a centre line C.

The metallic coating 12 is in the form of a thin adhesive backed metallic film. The film is applied onto the incident surface and then passed through hot rubber rollers. A suitable tool such as a wire brush is used to remove the metallic film from the region of the indent 15.

It can be seen from FIG. 1 that by removing the excess metallic film, the indent 15 thus defines the non-metallic, and therefore the non-reflective region of the incident surface 11.

The base 21 of the indent 15 has a midpoint 23. The indent is positioned relative to the lens element such that the centre line C of the lens element passes through the midpoint 23 of the base 21.

The lens element 14 is made from a plastic molding using a suitable molding process, such as injection molding.

The position of the indent 15, and more particularly, the non-reflective region and the lens element is critical, as will be seen later, to the behavior of light incident on the sun blind assembly.

The plastics material is also chosen so as to transmit light, a suitable plastic material being polycarbonate. Other plastic materials could also be used if appropriate, for example, if lower transmission of light is required then less translucent plastic materials could be used. Similarly the plastic could be tinted so as to reduce light transmission.

In another embodiment, the metallic coating can be applied to a non castellated incident surface using a screen printing process, with the screen being configured such that, after application of the metallic coating, the non-reflective regions are positioned correctly relative to the lens element 14.

The behavior of light incident on the sun blind assembly is as follows:

Light L from an external source, i.e. the sun or external artificial lighting from say a street lamp, is incident on the incident surface 11 of the assembly.

The light L is incident on either the reflective or the non-reflective region.

Light incident on the reflective region 16 is reflected, as indicated by arrow $L_1$, and is not transmitted through the lens element 14.

Light incident on the non-reflective region 18, is refracted, as indicated by arrow $L_2$.

The light L is refracted towards the normal $N_2$ since the light is passing from air (high refractive index) to plastic (low refractive index). The light is thus transmitted through the lens element 14.

The transmitted light, indicated by arrow $L_2$, passes through the lens element and is incident on a lower part 26 of the lens at the lens element/air boundary. The light $L_2$ is refracted away from the normal $N_3$ since the light is passing from plastic to air, and follows the path indicated by arrow $L_3$.

The arrangement of the indent relative to the lens element ensures that light incident on the lower part of the lens element 14 is at an angle θ, this angle being lower than the critical angle of the plastic material, and therefore all light incident on the lower part of the lens element 14 is refracted. The curvature of the lower part of the lens 26, and the arrangement of the centre line C with the midpoint 23, ensures that the refracted light $L_3$ emerges at an angle parallel with the centre line C.

It can be seen that light emerging from the lens element 14 is uniform across the width of the lens element 14 (i.e. it is uniform local to the lens element 14), and this is in spite of the fact that the region above the lens element 14 comprises two reflective regions where no light enters the lens element and a relatively narrow non-reflective region 18.

The combined effect of incident light on base 21 of the indent and the resulting emerging parallel light from the lower part of the lens 26, gives an appearance of uniform intensity of light from each lens element, and since the lens elements are arranged adjacent to each other, it gives the appearance of uniform intensity from the entire lower part of all lens elements, and therefore from inside the vehicle.

In other embodiments, adjacent lens elements may have progressively varying indent geometries, i.e. the width and/or depth may be altered, such that instead of a uniform light intensity across the entire assembly, there will be a progressive varying degree of light transmission. For example, the front of the screen could appear darker with the screen becoming lighter towards the back.

The vehicle occupant will thus have the benefit of a sun blind assembly which appears to be of uniform intensity, but since the base 21 represents approximately 20% of the width of the incident surface, the fact that 80% of incident light is reflected will result in a lower transmission of light, and therefore heat, into the vehicle.

In other embodiments, the width of the base 21 can be either increased or decreased, in effect, decreasing or increasing the width of the reflective region, so as to vary the amount of light reflected from the incident surface as required.

It will be appreciated that light incident on the sides 19 will also be refracted, and this light is also transmitted through the lens element. However, normal $N_4$ is perpendicular to normal $N_2$, and therefore the incident light L will be refracted towards $N_4$ and follow the path indicated by arrow $L_4$. The resultant path of the refracted light $L_4$ is such that when it is incident on the lower part 26 of the lens element it will be at an angle (not shown) which is greater than the critical angle of the plastic material, and thus the refracted light $L_4$ will be reflected (total internal reflection) from the lower part of the lens, and not refracted.

In this embodiment, the amount of refracted light is maximized, and hence the depth of the side portions is minimized. Increasing the depth of the side portions will result in a greater degree of total internal reflection, and hence less light transmission.

In other embodiments, the amount of light reflected due to total internal reflection can be exploited, as will be described later.

Figure 2:
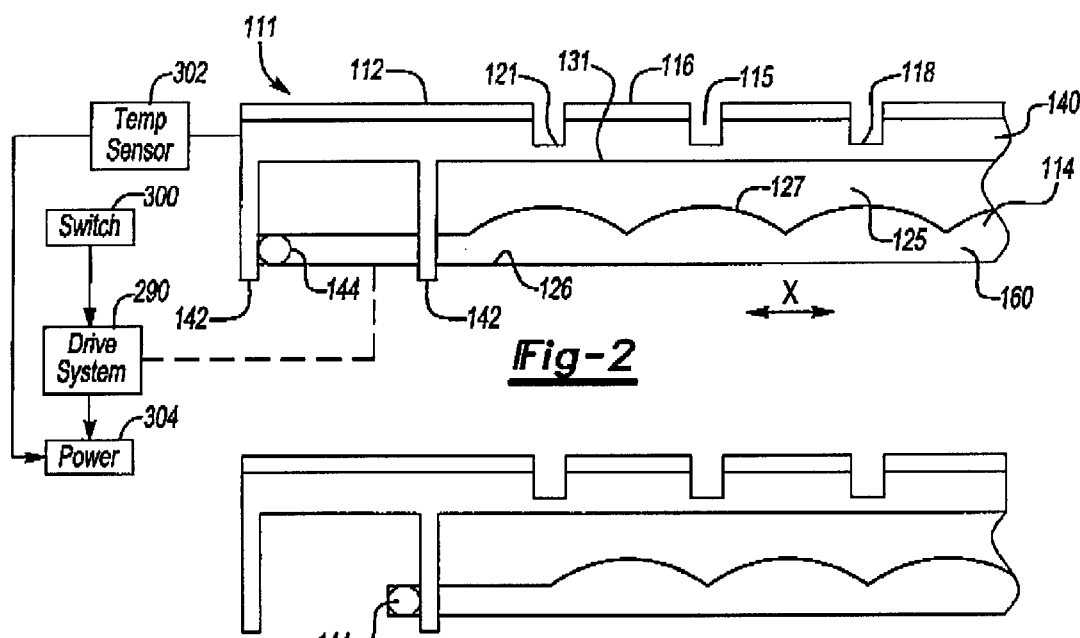
FIG. 2 is a cross-sectional view of part of the sun blind assembly according to the present invention in a first optically open position.
Figure 3:
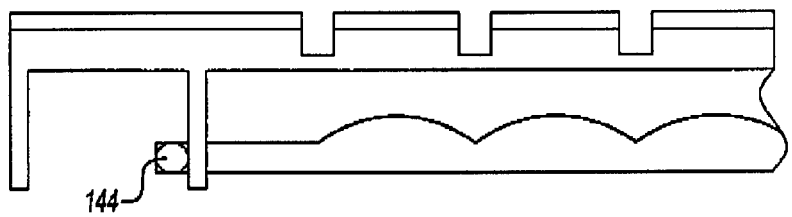
FIG. 3 is a cross-sectional view of the sun blind assembly of FIG. 1 in a second optically closed position, FIGS. 4 and are 5 are enlarged views of the sun blind assembly of FIGS. 2 and 3 showing the behavior of incident light.

With reference to FIGS. 2 and 3, there is shown an alternative sun blind assembly 110. Features which perform the same function as those in FIG. 1 are numbered 100 greater.

The assembly 110 includes a screen plate 140 which can move relative to a lens plate 160 as further described below.

The screen plate 140 includes a feature 142 (only one end of which is shown) which supports the lens plate. The feature 142 includes guide rails (not shown) which allow the lens plate to move relative to the screen plate in the longitudinal direction indicated X.

In other embodiments the feature could be included in a separate component, such as a carrier plate which is not integral with the screen plate, and is fixed to, for example, the vehicle roof.

The screen plate 140 includes an incident surface 111, with the incident surface having a plurality of reflective 116 and non-reflective regions 118. As in the embodiment of FIG. 1, the non-reflective region is defined by elongate indents 115.

The lens plate includes a plurality of corresponding elongate convex lens elements 114.

Both the screen plate and the lens plate are plastic moldings.

With reference to FIGS. 2 and 3, it can be seen that there is a region of air 125 located between the lens plate and the screen plate.

FIG. 2 shows the assembly whereby the non-reflective regions are arranged relative to the lens elements, as described in the embodiment of FIG. 1. This position is called a first optically open position, in which light behaves as described below.

As in the embodiment of FIG. 1, the position of the non-reflective regions is determined by elongate indents 115. However, unlike the embodiment of FIG. 1, where the lens elements cannot move relative to the non reflective regions, the embodiment of FIGS. 2 and 3, permits such movement.

FIG. 3 shows the assembly whereby the lens plate has been moved longitudinally, such that the non-reflective regions no longer correspond to the lens elements, and hence the focal point is no longer in line with the midpoint of base 121. This position is called a second optically closed position, in which light behaves as described below.

The lens plate moves as a result of manual actuation of a lever 144.

Figure 4:
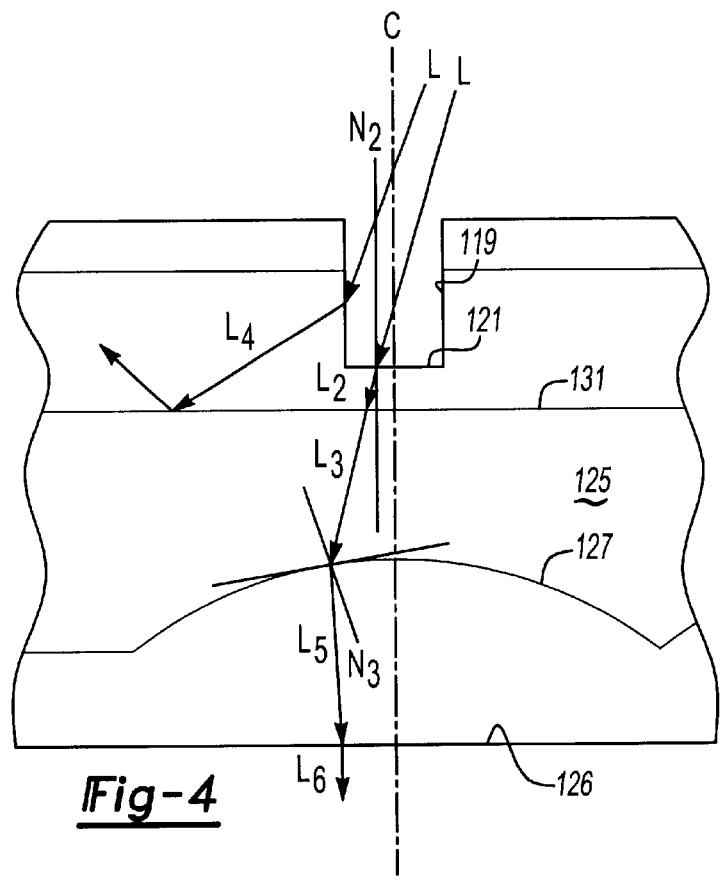
Figure 5:
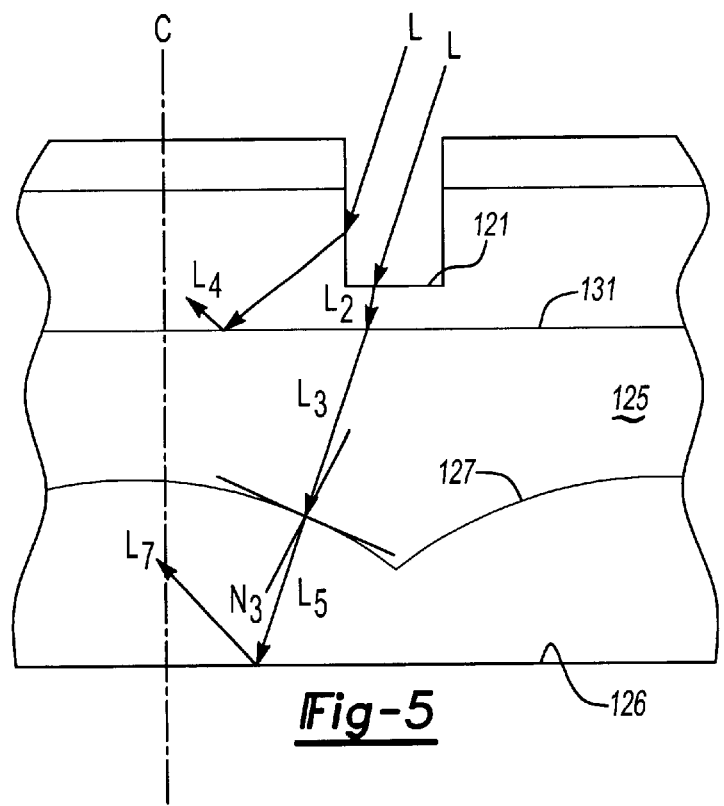

With reference to FIGS. 4 and 5, the behavior of light incident on the screen plate is as follows:

With the assembly in the first optically open position as shown in FIG. 4, light L incident on the base 121 is refracted towards normal $N_2$, and transmitted through the screen plate, following the path indicated by arrow $L_2$. The refracted light $L_2$ is incident on a lower part 131 of the screen plate. The refracted light $L_2$ is again refracted at the lower part 131, and is transmitted through the air region 125 following the path indicated by arrow $L_3$. The refracted light $L_3$ is incident on an upper part 127 of the lens element at the air/lens element boundary. The refracted light $L_3$ is refracted again towards normal $N_3$, and emerges parallel to the centre line of the lens following the path indicated by arrow $L_5$. The refracted light $L_5$ is transmitted through the lens plate, and since the light is normal to the lower part 126 of the lens plate, emerges, undeviated, below the lens plate following the path indicated by arrow $L_6$. Hence the appearance from inside the vehicle, with the assembly in the first optically open position, will be of uniform light.

With the assembly in the second optically closed position, as shown in FIG. 5, the light behaves as described above in the first optically open position, except that light $L_3$ incident on the upper part 127 of the lens element at the air/plastic boundary is refracted towards normal $N_3$, but since the position of the lens plate relative to the screen plate has changed, light refracted towards normal $N_3$ no longer emerges parallel to the centre line of the lens plate, but follows the path indicated by arrow $L_5$ The refracted light $L_5$ is transmitted through the lens plate, but since the light is no longer normal to the lower part 126 of the lens plate, the light will not emerge parallel. In fact the refracted light $L_5$ is at angle greater than the critical angle of the plastic material, and therefore the light will be reflected as indicated by arrow $L_7$. Hence the appearance from inside the vehicle, with the assembly in the second optically closed position, will not be of uniform light, but will be striated.

It will be appreciated that, as a result of internal reflection, there will be less light transmission with the assembly in the second optically closed position compared to the first optically open position.

Moving the lens plate between the first and second optical positions, thus provides a means for varying the appearance of the emerging light between uniform intensity and striated. The movement can be fully variable, or a fixed number of set positions.

As in the embodiment of FIG. 1, light incident on the sides 119 will also be refracted, and follow the path as indicated by arrow $L_4$.

It will be appreciated that the lens elements 114 are, as in the embodiment of FIG. 1, convex, but in the embodiment of FIGS. 2 and 3, the lens elements are inverted. This is because in FIG. 1 the transmitted light is travelling from plastic to air, whereas in FIGS. 2 and 3 the transmitted light is travelling from air to plastic. Thus, in another embodiment, where there is no air gap between the lens plate and the screen plate, the lens elements would be arranged as described in FIG. 1.

In other embodiments, the lens plate can move by operation of a motor drive system.

The motor drive system 290 can be activated by a switch 300 or triggered automatically upon the vehicle reaching a predetermined temperature.

In the case of automatic movement, a temperature sensor 302 is desirable, and suitable electronics programmed to control the drive system. The temperature sensor 302 can be incorporated into the assembly, for example, integral with the incident surface.

Power for the motor could come from an external power source 304, such as the vehicle's electrical system, or could be provided by a solar cell which can be incorporated into the incident surface of the screen plate. Note that the power source 304 can also power the temperature sensor 302.

It will be appreciated, that locations for features such as solar cells and temperature sensors can be integrated with the screen plate by designing the moulds accordingly.

For powered operation, the position of the lens plate relative to the screen plate is determined by micro switches which are positioned at suitable locations in the assembly, for example on the guide rails.

Figure 6:
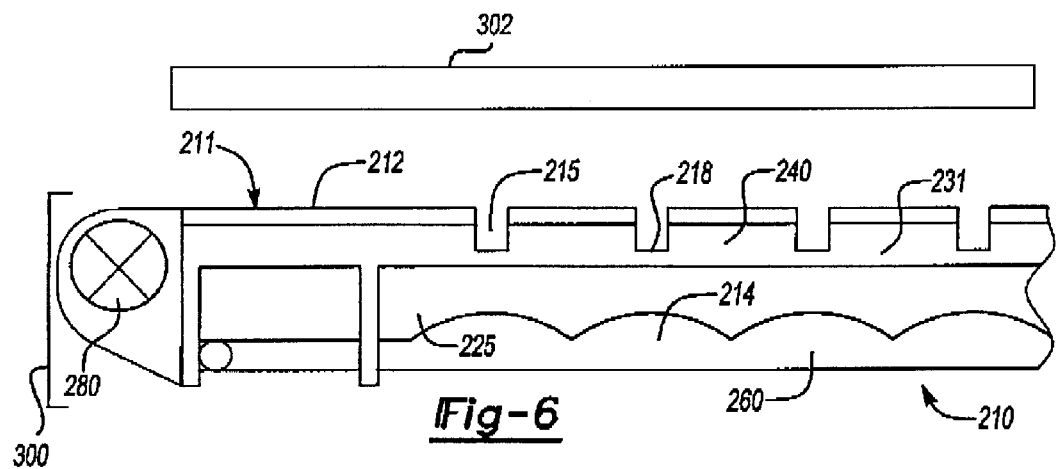
FIG. 6 is a cross-sectional view of an alternative sun blind assembly according to the present invention, in a first optically open position.
Figure 7:
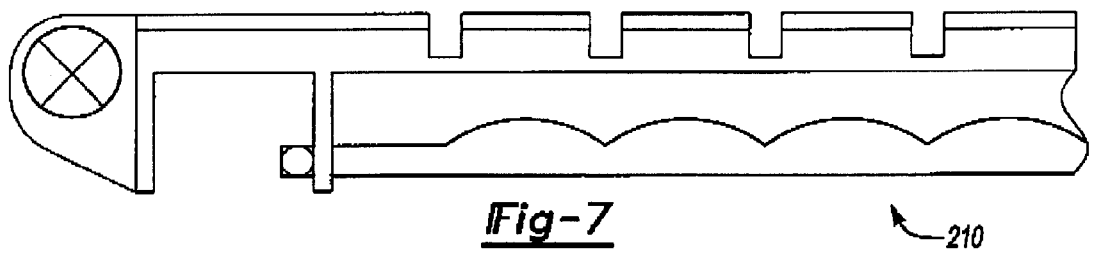
FIG. 7 is a cross-sectional view of part of the sun blind assembly of FIG. 6, in a second optically closed position

With reference to FIGS. 6 and 7, there is shown an alternative sun blind assembly 210, which is identical to the embodiment of FIGS. 2 and 3, except that an internal light source 280 is incorporated into the sun blind assembly. FIG. 6 also shows that the sun blind assembly 210 is supported by a rail 300. A sunroof 302 may be disposed above the assembly 210. Note that the rail 300 and the sunroof 302 is not limited to the embodiments Shown in FIGS. 6 and 7 and that a roof assembly incorporating the inventive sun blind assembly 210 may also include the rail 300 and the sunroof 302 without departing from the scope of the invention.

Light emerging from the internal source will scatter throughout the screen plate before being refracted at the lower part 231 of the screen plate. The refracted light will then be incident on the lens plate 260 which will behave as described in the embodiment of FIGS. 2 and 3, with parallel light emerging from below the lens plate. Thus the appearance from inside the vehicle will be of a uniform light source.

As in the embodiment of FIGS. 2 and 3, the lens plate can be moved relative to the screen plate so as to vary the intensity of the emerging parallel light as a result of the internal light source.

It should be noted that it is also possible to include a similar internal light source in the embodiment of FIG. 1, so as to provide a uniform light inside the vehicle. However, unlike the embodiment of FIGS. 6 and 7, the intensity of the light will not be variable since the lens element is fixed.

As has been described in the embodiments of FIGS. 1 to 7, the lens elements and indents are elongate. In other embodiments the lens elements can be non-elongate, for example annular, with corresponding annular indents.

The lens elements, lens plate and screen plate, being plastic moldings, can be modified during the molding process so as to produce two color moldings.

The lens elements, lens plate and screen plate can also be coated so as to provide resistance to scratches, UV, and chemicals.

The metallic coating of the sun blind assembly could also serve other functions. For example, the metallic coating could be used as an antenna for radio, mobile communication, remote keyless entry, and passive entry systems, thus eliminating the need for a separate antenna for such systems.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A vehicle sun blind assembly comprising:
   an incident surface, the incident surface having a reflective region in the form of a reflective fun on the incident surface which reflects incident light and blocks it from entering a vehicle interior and a non-reflective region in the form of an elongate indent which transmits incident light into the vehicle interior; and
   a lens element, wherein the lens element and incident surface are arranged such that the lens element substantially retracts the incident light transmitted by the non-reflective region of the incident surface such that the incident light appears to have substantially uniform intensity in the vehicle interior.

2. A vehicle sun blind assembly according to claim 1, wherein the incident surface has a plurality of reflective regions and a plurality of non-reflective regions.

3. A vehicle sun blind assembly according to claim 2, further comprising a plurality of lens elements, wherein each lens element corresponds with one of said plurality of non-reflective regions.

4. A vehicle sun blind assembly according to claim 2, wherein said plurality of non-reflective regions include at least two adjacent non-reflective regions having different dimensions to vary the percentage of incident light transmitted by the adjacent non-reflective regions into the vehicle interior.

5. A vehicle sun blind assembly according to claim 1, wherein the reflective film is a metallic coating.

6. A vehicle sun blind assembly according to claim 1, wherein the incident surface is located on a screen plate and the lens element is located on a lens plate, wherein the lens plate is moveable relative to the screen plate between a first, optically open position and a second, optically closed position.

7. A vehicle sun blind assembly according to claim 6 wherein the lens plate defines a plane substantially parallel to the screen plate and wherein the relative movement between the optically open position and the optically closed position occurs substantially parallel to the plane.

8. A vehicle sun blind assembly according to claim 6, further comprising a power source that powers the relative movement between the lens plate and the screen plate.

9. A vehicle sun blind assembly according to claim 6, wherein the screen plate and the lens plate are spaced apart to form a region of air located therebetween.

10. A vehicle sun blind assembly according to claim 1, further comprising a light source disposed between the incident surface and the lens element, wherein the light transmitted from the light source is incident on the lens element and is substantially refracted by the lens element.

11. A vehicle sun blind assembly according to claim 1, further comprising:
a drive system coupled to at least one of the incident surface and the lens element to drive relative movement between the incident surface and the lens element; and
a power source that powers the drive system.

12. A vehicle sun blind assembly according to claim 11, further comprising a temperature sensor coupled to the drive system, wherein the drive system is responsive to the temperature sensed by the temperature sensor.

13. A vehicle sun blind assembly according to claim 12, further comprising a solar cell that powers the temperature sensor.

14. A vehicle sun blind assembly according to claim 12, wherein the power source is coupled to the temperature sensor such that the power source powers the drive system automatically when the temperature sensor reaches a predetermined temperature.

15. A vehicle roof assembly with light transmission control, comprising:
a sun blind assembly comprising
an incident surface, the incident surface having a plurality of reflective regions in the form of a reflective film on the incident surface which reflect incident light and blocks it from the entering a vehicle interior and a plurality of non-reflective regions in the form of elongate indents which transmit incident light into the vehicle interior; and
a plurality of lens elements corresponding with said plurality of non-reflective regions, wherein the lens elements and incident surface are arranged such that the lens element substantially refracts the incident light transmitted by the non-reflective region of the incident surface such that the incident light appears to have substantially uniform intensity.

16. A vehicle roof assembly according to claim 15, wherein the incident surface is located on a screen plate and the plurality of lens elements are located on a lens plate, wherein the lens plate is moveable relative to the screen plate between a first, optically open position and a second, optically closed position.

17. A vehicle roof assembly according to claim 15, further comprising a temperature sensor.

18. A vehicle roof assembly according to claim 17, further comprising a power source that powers the relative movement between the lens plate and the screen plate is powered, wherein the power source is coupled to the temperature sensor such that the power source powers the relative movement automatically when the temperature sensor reaches a predetermined temperature.

19. A vehicle roof assembly according to claim 18, wherein the power source is a solar cell.

20. A vehicle roof assembly of claim 15, further comprising a sunroof disposed on the vehicle above the sun blind assembly.

21. A vehicle roof assembly of claim 15, further comprising at least one rail that supports the sun blind assembly.

* * * * *

UNITED STATES PATENT AND TRADEMARK OFFICE
CERTIFICATE OF CORRECTION

PATENT NO. : 6,688,681 B2
DATED : February 10, 2004
INVENTOR(S) : Birt

It is certified that error appears in the above-identified patent and that said Letters Patent is hereby corrected as shown below:

<u>Column 6,</u>
Line 58, "fun" should read as -- film --

Signed and Sealed this

Eleventh Day of May, 2004

JON W. DUDAS
*Acting Director of the United States Patent and Trademark Office*